Feb. 10, 1942.   J. O. REED   2,272,583
FILTERING APPARATUS
Filed Feb. 8, 1940   2 Sheets-Sheet 1

INVENTOR
Jesse O. Reed
BY
ATTORNEYS

Feb. 10, 1942.   J. O. REED   2,272,583
FILTERING APPARATUS
Filed Feb. 8, 1940   2 Sheets-Sheet 2

INVENTOR
Jesse O. Reed
BY
ATTORNEYS

Patented Feb. 10, 1942

2,272,583

UNITED STATES PATENT OFFICE 2,272,583

FILTERING APPARATUS

Jesse O. Reed, Washington, D. C., assignor to Henry A. Wallace, as Secretary of Agriculture of the United States of America, and his successors in office Application February 8, 1940, Serial No. 317,883

1 Claim. (Cl. 210—183)

(Granted under the act of March 3, 1883, as amended April 30, 1928; 370 O. G. 757)

This application is made under the act of March 3, 1883, as amended by the act of April 30, 1928, and the invention herein described and claimed, if patented, may be manufactured and used by or for the Government of the United States of America for governmental purposes without the payment to me of any royalty thereon.

This invention relates to an apparatus for filtering materials, especially those which are ordinarily difficult to filter, such as turpentine gum.

Some of the objects of this invention are to provide a filter apparatus which is flexible in operation, which can be easily and readily cleaned, which utilizes inexpensive and easily replaced filtering media, and which occupies a very small space as compared to other filter apparatus of comparable capacity.

The following description, together with the accompanying drawings, will disclose this invention more fully, its construction, arrangement, and combination of parts, and further objects and advantages thereof will be apparent.

Figure 1:
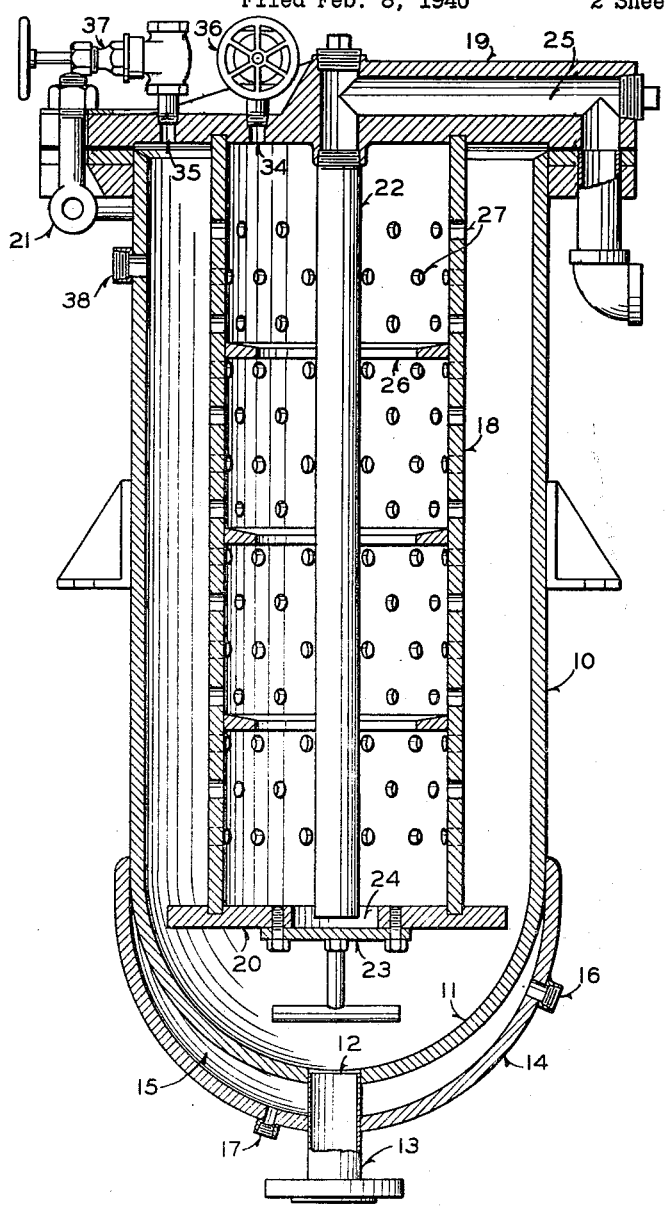
Figure 1 is a vertical section of an embodiment of this invention without the filter media.
Figure 2:
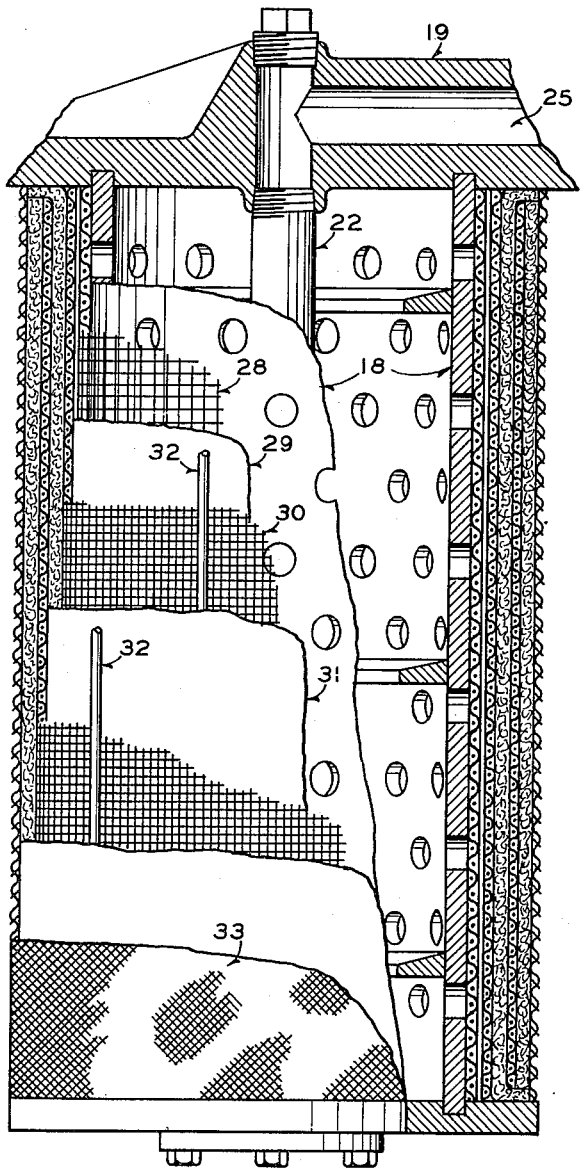
Figure 2 is an enlarged view, partly in section, of the filter cylinder or spool hereinafter designated by the numeral 18 with the filter media disposed thereon.

Referring with more particularity to the drawings, in which like numerals designate like parts, the embodiment illustrated comprises a vertical cylinder 10, the bottom 11 of which is cup-shaped to form a reservoir and provided with an inlet 12 to which is connected a vertical inlet pipe 13. Beneath the bottom portion 11 of said cylinder, the housing 14 is provided forming a jacket space 15 around said bottom portion and about the inlet pipe 13, substantially as shown. The jacket space 15 is provided with an inlet 16 and an outlet 17 with suitable fittings therefor to make the necessary connections to provide a steam or hot water jacket.

An inner cylinder or spool 18 is mounted within the cylinder 10, substantially as shown, and is provided with an upper head 19 and a lower head 20. The head 19 also extends over the top of the outer cylinder 10 and is held in place by swing bolts 21 or any other suitable means which will permit a quick opening. The head 19 is fixed to the spool 18, so that said spool is suspended therefrom.

A discharge pipe 22 is disposed axially within the spool 18 and extends to within a short distance of a cover plate 23 secured beneath a central aperture 24 through the lower spool head 20. The upper end of the pipe 22 communicates through the upper spool head 19 with an outlet conduit 25.

Within the spool 18 reinforcing rings 26 are provided to prevent the collapsing of the spool when the apparatus is operating at high pressures.

The wall of the spool 18 is perforated with a number of apertures 27 through which the filtrate passes. The filtering media is placed around the spool 18 and may be of any desired type known to the art. However, it is suggested that the following construction be employed: A wire fabric 28 is first wound around the outside of the spool 18. Then filter paper 29 is wound around the wire fabric 28. Then several turns of a flexible wire fabric 30 are wound on the filter paper and made to fit closely between the heads 19 and 20. With the wire fabric 30 there is also wound cotton batting 31 which should be cut slightly wider than the wire fabric 30 and the space between the heads 19 and 20, so that as the cotton batting 31 is wound around the spool with the flexible wire fabric 30, the ends of the batting will become bound to the sides of the spool heads 19 and 20, thereby preventing leakage of the filter at the junction of the said spool and heads. The flexible wire fabric 30 is preferably of the spiral woven type, and at spaced intervals along the length of the wire fabric, rods 32 are transversely disposed, each within one of the spirals making up the wire fabric. These rods serve to prevent the material being filtered from following the turns of wire fabric and thus to by-pass the layers of cotton. By employing these rods 32, the material is forced to pass through each layer of cotton batting. The cotton batting, as illustrated, is wound with the wire fabric and each turn is on the outside of its correponding turn of wire fabric. Consequently, the last turn of cotton batting requires some protection which is provided by a turn of burlap 33 or other suitable coarsely woven fabric.

Through the spool head 19 there are provided two apertures, namely, apertures 34 and 35, having valves 36 and 37, respectively. The opening 34 is a vent for the space in the interior of spool 18, and the opening 35 is a vent for the space between the two cylinders 10 and 18.

The pipe connection 38 through the wall of the outer cylinder 10 is used in cleaning the apparatus with live steam, air, or hot water.

In operation the material to be filtered is fed into the apparatus under pressure through the pipe 13 into the space between the cylinders 10 and 18. The valve 37 is kept open until all the air in this space between the two cylinders is exhausted and said space becomes entirely filled with the crude material. At this point, the valve 37 is closed and the pressure forces the material through the filtering media of cotton batting 31, wire 30, and paper 29. The coarsely woven fabric on the outside, namely, the burlap 23, strains out the coarse particles and the successive layers of cotton batting strain out or withhold the fine particles, with the result that by the time the material being filtered reaches the layer of filter paper 29, only the very finest particles remain to be filtered out. After passing through this filtering media, the filtered material enters the interior of the spool 18 through the apertures 27 and flows down into opening 24 of the spool head 20 and is discharged through the pipe 22 and the conduit 25 due to the increase in pressure of the air entrapped within the spool 18. Any vapors given off by this filtrate would, of course, increase this pressure. The valve 36 is used for venting excess vapors of heated materials from the interior of spool 18 so that these vapors are not discharged from the filter with the filtrate to cause foaming, which may be undesirable. This valve 36 may also be used to control operating conditions within the spool 18 in the handling of materials not heated. For example, it may be used to admit air to the spool 18 when it is desired to remove the filtrate under vacuum.

When it is desired to discontinue the operation of the filter and change the filter media on the spool 18, steam or air under pressure is forced through the pipe opening 38 into the space between the cylinders 10 and 18 which forces out, through the inlet 12 and pipe connection 13, the unfiltered materials remaining in this space.

Having thus described my invention, I claim:

A filter apparatus comprising a housing having a cup-shaped bottom, a steam jacket around said bottom, a pipe connected to the bottom of said housing through said jacket, a cover plate removably secured on the top of said housing, a perforated hollow cylinder concentrically disposed in said housing, said cylinder being suspended from said cover plate, reinforcing rings against the inner surface of said cylinder, an end plate of substantial thickness secured to the bottom of said cylinder, said end plate having an aperture through the center thereof, a smaller plate removably secured on the bottom of said end plate to cover said aperture, an imperforate outlet tube coaxially disposed through said cylinder, said tube being suspended at one end from said cvoer plate, the other end of said tube terminating above said smaller plate in said aperture, said cover plate having a conduit therethrough communicating with said tube, said cover plate having vents therethrough, one of said vents communicating with the space between said cylinder and said tube, and another vent communicating with the space between said cylinder and housing, valves connected to said vents, a filter medium comprising alternate layers of cotton batting and wire fabric spirally disposed about the outside surface of said cylinder, the innermost layer of cotton batting having extended portions over the ends of the outer layers of cotton batting and wire fabric, said extended portions being forcibly held against the cover plate at the top and against said end plate at the bottom, and baffle rods between consecutive layers of said cotton batting.

JESSE O. REED.